United States Patent [19]

Petranto

[11] 4,343,496
[45] Aug. 10, 1982

[54] SPLIT GLAND

[75] Inventor: Joseph J. Petranto, Los Alamos, N. Mex.

[73] Assignee: The United States of America as represented by the United States Department of Energy, Washington, D.C.

[21] Appl. No.: 174,284

[22] Filed: Jul. 31, 1980

[51] Int. Cl.³ .............................................. F16L 35/00
[52] U.S. Cl. .................................. 285/39; 285/334.5; 285/387; 411/433
[58] Field of Search ................ 285/387, 39, 388, 325, 285/334.5, 327, 418, 33, 419; 411/432, 433

[56] References Cited

U.S. PATENT DOCUMENTS

| 519,568 | 5/1894 | Cooney . | |
|---|---|---|---|
| 919,913 | 4/1909 | Miller . | |
| 1,580,964 | 4/1926 | Crandall . | |
| 3,515,415 | 6/1970 | Clark et al. | 285/387 X |
| 3,679,237 | 7/1972 | DeAngelis | 285/387 X |
| 3,684,993 | 8/1972 | Hazen et al. | 411/432 |
| 3,734,547 | 5/1973 | Kojima | 285/357 |
| 3,970,336 | 7/1976 | O'Sickey | 285/341 |

FOREIGN PATENT DOCUMENTS 726374  4/1980  U.S.S.R. ............................ 411/432

Primary Examiner—Dave W. Arola
Attorney, Agent, or Firm—Robert W. Weig; Paul D. Gaetjens; Richard G. Besha

[57] ABSTRACT

The disclosure relates to a split gland laterally fittable over tubing. Two essentially mirror image half glands are juxtaposed, held together by a spring clip and aligned by a retainer.

11 Claims, 5 Drawing Figures

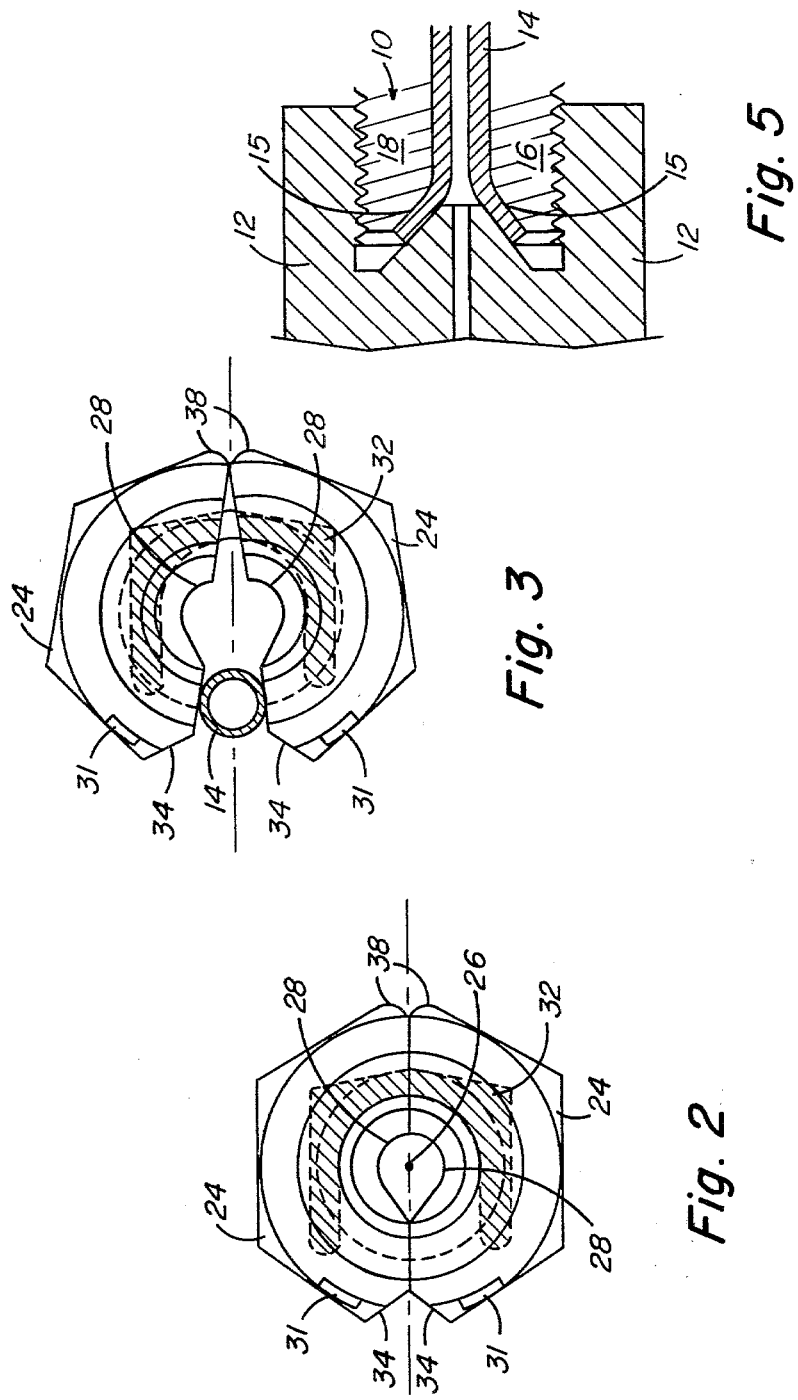

SPLIT GLAND

This invention is a result of a contract with the Department of Energy (Contract No. W-7405-ENG-36).

BACKGROUND OF THE INVENTION

The invention relates to glands and more particularly to a split gland which can be laterally slipped over tubing rather than necessarily be placed on tubing by sliding it over an end thereof.

Typical applications for glands include attaching conduit or tubing between fuel pump and carburetor, cooling lines between radiators and automatic transmissions, and pressure lines in both pneumatic and hydraulic systems in automotive, aircraft, marine, earth moving, agricultural equipment and the like. In such applications, the tubing is typically steel or copper, pre-formed or bendable to form. Conventional glands must be slipped over the ends of the tubing. The tubing is then usually either flared or ferrules are disposed on the tubing near its ends. The ends of the tubing are then secured to appropriate fittings by the glands being threaded therein to form fluid tight connections.

Once the tubing is bent a sufficient amount, conventional glands cannot be slid over the bend because the inside diameter of the gland must be sufficiently small to hold the tubing in position when the gland is threaded into a fitting. Hence, conventional glands can only be slid along relatively straight tubing.

At times the threads of a gland are stripped during the connection of tubing to a fitting, the flats of the head of the gland become rounded, or the gland may be discovered to be defective after it is in place on the tubing. Any of these conditions may occur after the gland is on the tubing and the tubing is flared or a ferrule mounted thereon. In such cases, the tubing must be severed in order for the gland to be removed. The tubing must then be replaced or the severed tubing reconnected in some manner, necessitating additional parts and labor. In some cases, a length of tubing may contain a series of very tight bends. A conventional gland cannot be slipped the length of such a tubing. For these and many other reasons known to those skilled in the art it is extremely desirable to have a gland which can be slipped laterally over tubing.

SUMMARY OF THE INVENTION

One object of the invention is to provide for gland replacement without severing formed, flared or ferruled tubing.

Another object of the present invention is to provide for easy replacement of damaged glands in place on tubing.

Yet another object of the present invention is to provide a gland suitable for mounting on formed tubing disposed in hard to enter or tight work areas.

In accordance with the present invention there is provided a split gland comprising a pair of separate, essentially mirror image half glands, the pair of half glands being fittable together about a mutual axis of rotation to form effectively a single split gland. Each half gland comprises a threaded portion, a shoulder, and a wrench engaging head portion, and contains a concave inner surface fittable about tubing of appropriate size. The half glands are held together with a spring clip disposed about their shoulders and are maintained essentially fixedly juxtaposed to one another with substantial thread alignment by a horseshoe shaped retainer or key fitted into slots in each half gland. In a preferred embodiment, the shoulder contains a flange for retaining the spring clip, the spring clip being preferably essentially circular with a spreadable gap between its ends. Also in the preferred embodiment, the shoulder flange is essentially circular and has ends; tabs preferably disposed on the ends of the spring clip engage the ends of the flange and keep the spring clip from sliding about on the shoulder. The inner surfaces of the split gland in a preferred embodiment form a teardrop shape to enable the split gland to be emplaced on and removed from tubing with less effort. In the preferred embodiment the wrench engaging head contains a V-shaped starter notch so that the gland may be more easily slipped onto tubing. The preferred embodiment also comprises a radiused notch on the opposite side of the head from the V-shaped notch so that the axis about which the split gland spreads is nearer its axis of rotation, thereby reducing necessary spreading of the spring clip during mounting and demounting of the split gland.

One advantage of the present invention is that malfunctioning or faulty glands can be replaced without severing or replacing tubing or removing tubing from its place on or in equipment.

Another advantage of the present invention is that split glands in accordance therewith can be slipped onto tubing and removed therefrom without cutting the tubing if it is already in place, pre-formed or bent, flared or has ferrules crimped on it.

Still another advantage of the present invention is that where errors are made in assembling hardware and a required gland is left off a piece of tubing which is bent to form or flared, the tubing need not be junked or severed.

Yet still another advantage of the instant invention is that split glands in accordance therewith can be slid over tight bends in tubing.

BRIEF DESCRIPTION OF THE DRAWINGS

The accompanying drawings, which are incorporated in and form a part of the specification, illustrate a preferred embodiment of the present invention and, together with the description, serve to explain the principles of the invention. In the drawings:

FIG. 2 is an end view of the FIG. 1 split gland, showing its teardrop shaped inner surfaces, horseshoe shaped key or retainer, radiused notch, and tubing starting notch;

FIG. 3 shows the preferred embodiment of FIGS. 1 and 2 spread receiving tubing;

FIG. 5 shows the preferred embodiment threaded into a fitting with flared tubing.

DETAILED DESCRIPTION OF THE INVENTION

Figure 1:
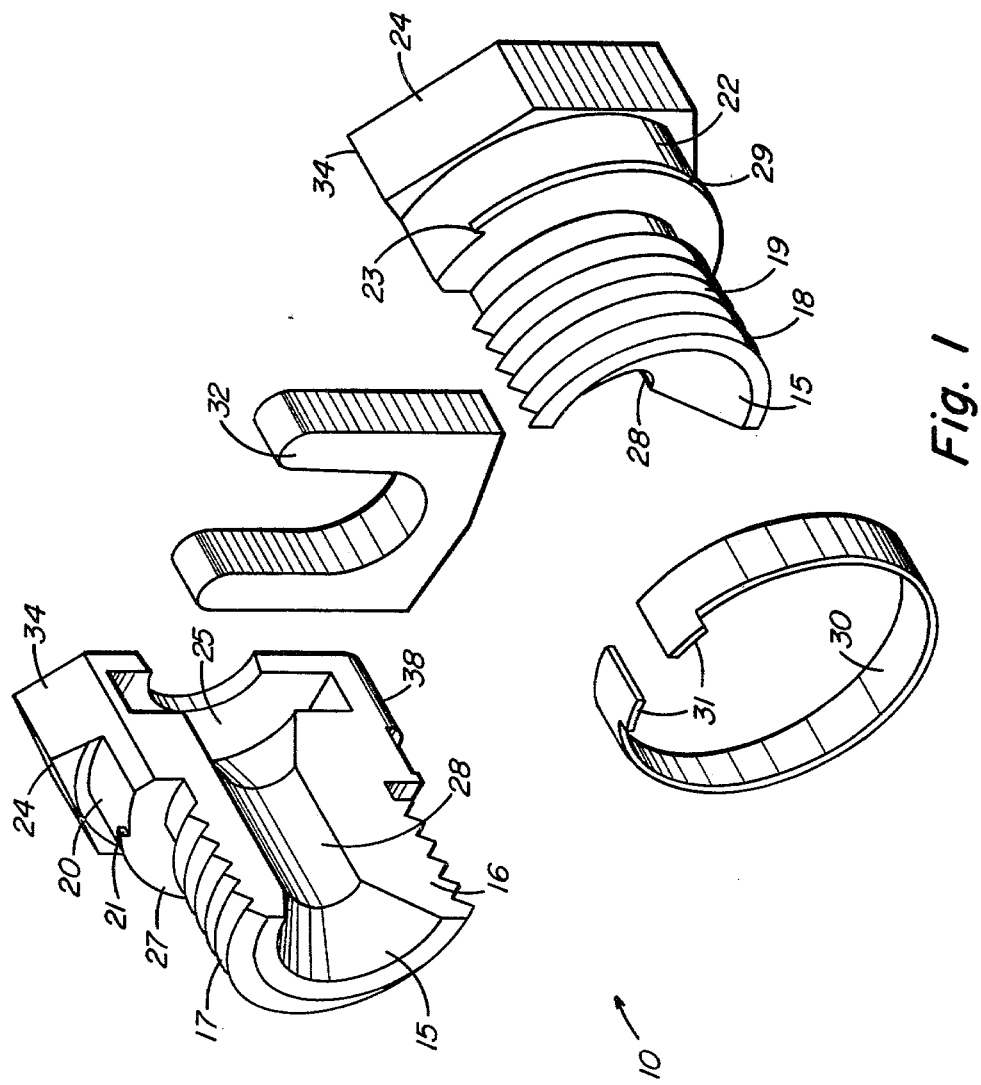
FIG. 1 shows an exploded view of a preferred embodiment of a split gland in accordance with the invention.
Figure 4:
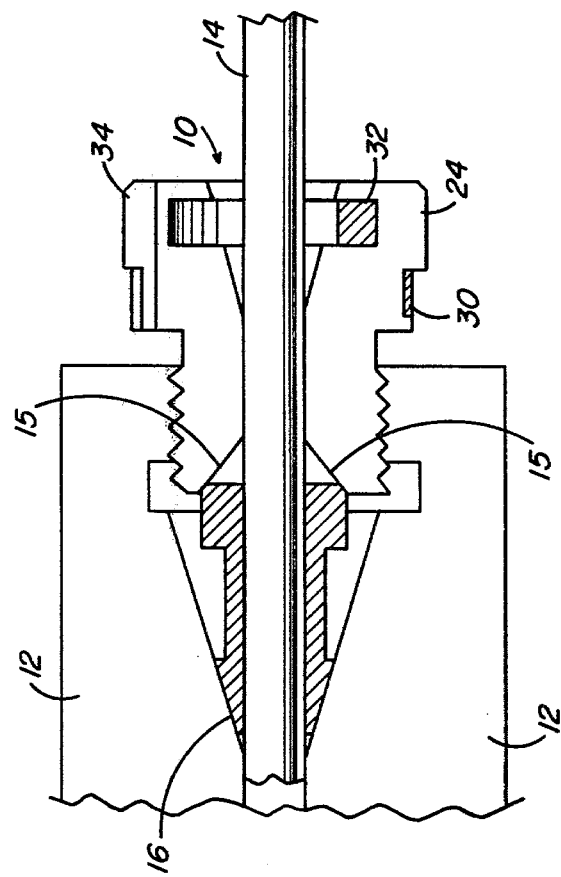
FIG. 4 shows the preferred embodiment threaded into a fitting with a ferrule on the tubing.

Reference is now made to FIGS. 1 and 4, the former showing an exploded view of a preferred embodiment of a split gland 10 in accordance with the invention. FIG. 4 illustrates split gland 10 threaded into a fitting 12 which comprises a threaded orifice in any kind of structure into or out of which a fluid is to flow. The purpose of gland 10 is to provide a connection between tubing 14 and fitting 12 so that no fluid flowing through their connection will leak. In the embodiment shown in FIG. 4, a ferrule 16 is disposed on tubing 14 near its end. However, as can be seen in FIG. 5, the split gland in accordance with the invention may also be used with flared tubing and a fitting 12. It will be apparent to those of ordinary skill in the art that the invention is directed to a split gland itself; whether a ferrule, flared tubing or other well known sealing structure for tubing used with glands is utilized is not part of the invention. Many ways of sealing tubing are well known and gland mouths 15 may take various configurations as is well known to those of ordinary skill in the art.

Split gland 10 comprises a pair of separate, essentially mirror image half glands 16 and 18, comprising threaded portions 17 and 19, respectively, shoulder portions 20 and 22, respectively, and wrench engaging head portions 24. Half glands 16 and 18 are preferably essentially mirror images except for the threading which clearly must be structured so that a continuously threaded portion, as in conventional glands, results when the two half glands are joined. When the two half glands mate, they define a common axis of rotation 26, as seen in FIG. 2. Each half gland is, except for slight thread differences, a mirror image of the other about this axis. The inner surfaces 28 are preferably not cylindrical, although they could be, as in conventional devices, but preferably are teardrop shaped in cross section as best seen in FIG. 2 to allow for the gland to be slipped off tubing with less effort. The head portion 24 is preferably typically hexagonal, such as is common on threaded fastening devices, but its particular shape is not essential to the invention and those skilled in the art will recognize that the number of flats on the head may be four, eight, or any other number. Alternatively, the head may comprise a peculiar configuration engagable with a particular wrench.

A slot 25, preferably but not necessarily perpendicular to axis 26, is provided in each of the half glands and may be disposed anywhere along its length. In the preferred embodiment it is conveniently disposed in the vicinity of the shoulder portion of the gland. A horseshoe shaped key or retainer 32 fittable into slot 25 retains the two halves fixedly abutted against one another in juxtaposition so that their threads match. Thus, the split gland may be easily threaded into a fitting without danger of cross threading or other potential problems. Retainer 32 need not be horseshoe shaped as shown, but the shape illustrated has been found to perform satisfactorily, be convenient and workable, providing a gap sufficiently wide that the gland may be readily slipped laterally onto tubing. Slot 25 preferably is formed so that potential rotation of retainer 32 is restricted, its open end maintaining sufficient alignment with the split in the gland to allow tubing to pass laterally therethrough without obstruction.

In the preferred embodiment, spring clip 30 has tabs 31 which engage the ends 21 and 23 of flanges 27 and 29 on shoulders 20 and 22 which act to hold spring clip 30 in position on the shoulders. There preferably is some gap in spring clip 30 so that the gland can be readily slipped laterally over tubing; thus spring clip 30 preferably does not completely encircle the split gland. As seen in FIGS. 1-4, a tubing starting notch is provided in the preferred embodiment in the form of V-shaped notch 34 in head portions 24. Notch 34 provides the gland with a non-slip starting position from which it can be laterally slipped over the tubing. Also in the preferred embodiment, necessary spread is reduced by providing a radiused notch 38. The action of notch 38 can best be seen in FIG. 3 which shows the gland spread receiving tubing. As previously mentioned and as seen in FIG. 3, teardrop shaped inner surfaces 28 advantageously provide for easier lateral removal of the gland from tubing.

The split gland of the invention can be snapped over formed tubing at any appropriate location after all bends have been made therein. The split gland can be slid over tubing bends by spreading slightly which a conventional gland cannot do. It will be appreciated that once in place the split gland can be easily removed without straightening or cutting the tubing or altering its ends, simply by slipping it off laterally. Thus, tubing can be inserted through small openings and the gland fitted after the tubing's insertion through such openings.

A split gland in accordance with the invention can be used in an application requiring a bend very near an end of the tubing. It is very difficult to use a standard gland in this type of situation because it cannot pass over a relative sharp bend radius. The split gland of the present invention can simply be laterally slipped onto the tubing after the tubing is bent in place and its end flared or ferruled.

The foregoing description of a preferred embodiment of the invention has been presented for purposes of illustration and description. It is not intended to be exhaustive or to limit the invention to the precise form disclosed, and obviously many modifications are possible in light of the above teaching. The embodiment chosen was described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A split gland comprising:
a pair of separate unconnected essentially mirror image half glands, said pair fittable together about a mutual axis of rotation, each of said half glands comprising a threaded portion, a shoulder, a wrench engaging head portion a slot, and a concave inner surface along said mutual axis of rotation, said half glands being held together by a spring clip having a circumferential extent greater than 180 degrees disposed about said shoulders and being maintained essentially fixedly juxtaposed to one another with substantial thread alignment by a retainer fitted into said slot in each of said half glands wherein said spring clip allows said half glands to be spread sufficiently to allow said gland to be slipped laterally over tubing and wherein each said concave inner surface is defined by a wall portion and together engage the tubing and define a teardrop shape with the narrow portion being located at the area which passes laterally over the tubing so that upon removal of said gland from the tubing said teardrop shape inner surface promotes spreading of the gland.

2. The invention of claim 1 wherein said retainer is substantially horseshoe shaped.

3. The invention of claim 1 wherein said shoulder is flanged to retain said spring clip in position thereon.

4. The invention of claim 1 wherein said spring clip is essentially circular in shape, has ends and a spreadable gap between said ends.

5. The invention of claim 4 wherein said spring clip has tabs at its ends, said shoulder is essentially circular, having a flange which has ends, said tabs being engagable with the ends of said shoulder flanges to maintain said spring clip in position.

6. The invention of claim 1 wherein said wrench engaging head of said gland comprises a notch for engaging tubing so that as said notch is pushed against tubing, said half glands spread and said gland slips onto the tubing.

7. The invention of claim 6 wherein said notch is V-shaped.

8. The invention of claim 1 wherein said gland comprises a mouth for use with flared tubing.

9. The invention of claim 1 wherein said gland comprises a mouth for use with ferruled tubing.

10. The invention of claim 1 wherein said wrench engaging head portions comprise a radiused notch to render said gland laterally slippable over tubing with reduced spreading.

11. The invention of claim 1 wherein said gland is spreadable as it slides over tubing lengthwise to accommodate bends therein.

* * * * *